Jan. 30, 1951  S. L. GOLDSBOROUGH ET AL  2,539,416
PHASE-COMPARISON CARRIER-CURRENT RELAY
Filed Nov. 28, 1947
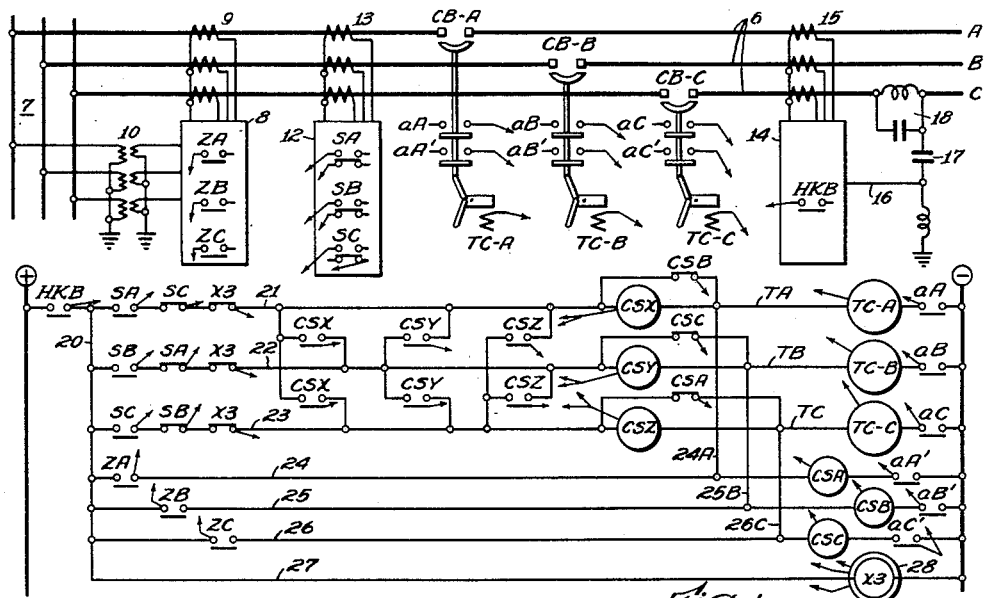
Fig.1.
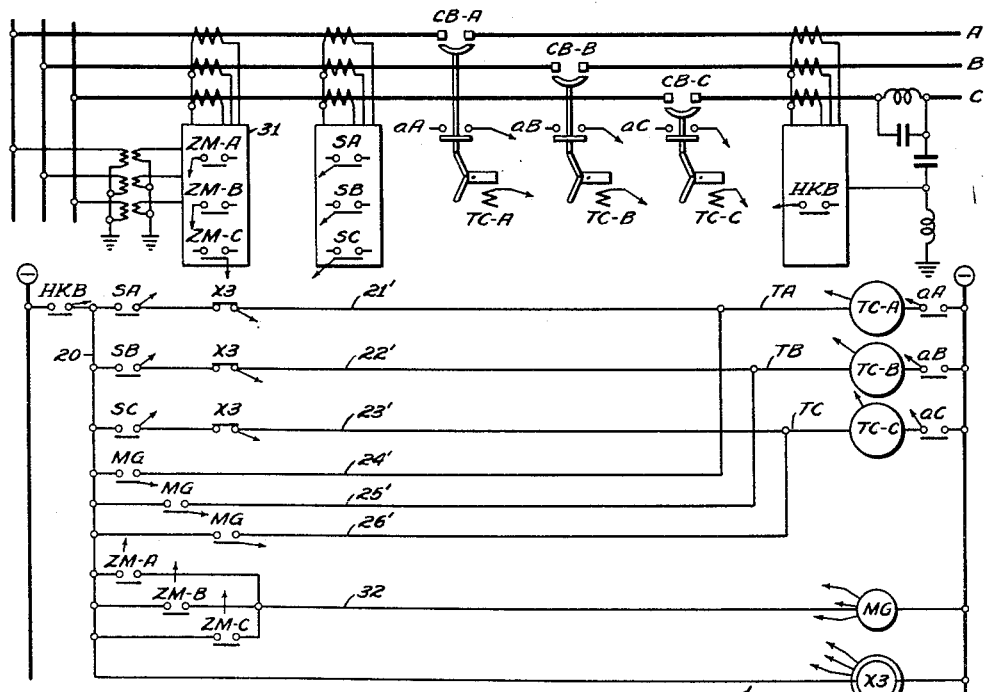
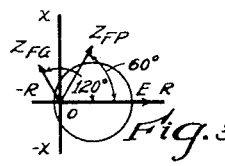
Fig.3.
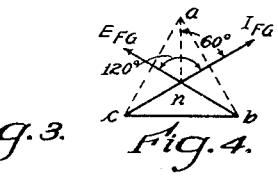
Fig.4.
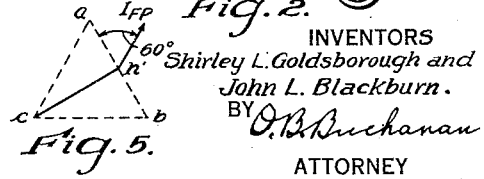
Fig.5.
INVENTORS
Shirley L. Goldsborough and
John L. Blackburn.
BY O. B. Buchanan
ATTORNEY Patented Jan. 30, 1951

2,539,416

UNITED STATES PATENT OFFICE 2,539,416

PHASE-COMPARISON CARRIER-CURRENT RELAY

Shirley L. Goldsborough, Basking Ridge, and John L. Blackburn, East Orange, N. J., assignors to Westinghouse Electric Corporation, East Pittsburgh, Pa., a corporation of Pennsylvania Application November 28, 1947, Serial No. 788,581

5 Claims. (Cl. 175—294)

Our invention relates to the application of a phase-comparing carrier-current relaying-system to the control of single-pole breakers, using either selective-pole or single-pole tripping.

A phase-comparison carrier-current relaying-system is a system for the protection of a line-section of a transmission-line, by transmitting carrier on alternate half-cycles of the line-current, and thereby comparing the relative phases of the two terminal line-currents, in order to determine the existence of a fault somewhere within the confines of the protected line-section. Heretofore, a response of a phase-comparison carrier-current relay-apparatus has been used to initiate the gang-tripping of all three poles of a line-sectionalizing circuit-breaker. Examples of such a system are shown in the Lensner Patent 2,406,615, granted August 27, 1946, the Mehring et al. Patent 2,408,868, granted September 24, 1946, and a copending Lensner et al. application, Serial No. 758,200, filed June 30, 1947.

A selective-pole tripping-system is a protective relaying-system for controlling the several individual circuit-breaker poles, and characterized by opening only the minimum number of breakers necessary to clear a fault, an example of this kind of tripping-system being described and claimed in a Goldsborough application, Serial No. 569,181, filed December 21, 1944, patented February 22, 1949, No. 2,462,179.

A single-pole tripping-system is a protective system in which single-pole breaker-operation is obtained only in the event of a single line-to-ground fault, and in which three-pole breaker-operation is provided for all faults between phases, an example of this kind of tripping-system being shown in the Goldsborough Patent 2,320,861, granted June 1, 1943.

Both selective-pole and single-pole tripping-systems have heretofore used supervision by a distance-type carrier-current protective system, using individual phase-fault and ground-fault distance-responsive and directionally responsive relays, one of each kind for each phase, for detecting a fault within the protected line-section, and checking that information against similar information received from the far end of the protected line-section, in order to be able to detect faults clear out to the far end of the section, without risk of overtripping, for faults beyond the far end of the protected line-section. Examples of such distance-type carrier-current systems are found in the Lenehan et al. Patent 2,255,934, granted September 16, 1941, the Blackburn et al. Patent 2,367,921, granted January 23, 1945, and a Lenehan application, Serial No. 599,832, filed June 16, 1945, patented September 14, 1948, No. 2,449,490.

It is an object of our present invention to provide a simpler relaying-system for controlling single-pole circuit-breakers, using a phase-comparison carrier-current system, supplemented by the faulty-phase phase-selectors of the Goldsborough Patent 2,320,861, or any equivalent phase-selectors, and further supplemented by any suitable distance-responsive relays, such as are shown in the Goldsborough Patent 1,934,662, granted November 7, 1933, or the Goldsborough Patent 2,393,983, granted February 5, 1946, or any modifications or equivalents thereof, with certain special adjustments which will be hereinafter described.

A further object of our invention is to provide a single-pole tripping-system using a special adjustment of the trip-circle characteristics of a modified-impedance relay of the type shown in the Goldsborough Patent 2,393,983, whereby to avoid a response of a phase-fault distance-element to a close-in line-to-ground fault, thereby greatly simplifying the control.

With the foregoing and other objects in view, our invention consists in the systems, circuits, combinations, elements and methods of design and operation, which are hereinafter described and claimed, and illustrated in the accompanying drawing, wherein:

Figure 1 is a simplified diagrammatic view of circuits and apparatus illustrating the application of our invention in a selective-pole tripping-system, Fig. 2 is a similar view illustrating an application of the invention in a single-pole tripping-system, Fig. 3 is an impedance-diagram showing the response-circle characteristic of the special phase-fault impedance-element adjustment utilized in the single-pole tripping-system of Fig. 2, and Figs. 4 and 5 are vector diagrams showing the phase-relations of the controlling current and voltage of the same relay, for a single ground-fault, and for a phase-to-phase fault, respectively.

In the drawing, we have illustrated our invention as applied to one terminal of a line-section 6 of a three-phase transmission-line, which is connected to a three-phase station-bus 7 by means of three single-pole circuit-breakers CB—A, CB—B and CB—C, having trip-coils TC—A, TC—B and TC—C, and each having two sets of auxiliary make-contacts aA, aA'; aB, aB'; and aC, aC', respectively. The line-phases are distinguished by the letters A, B and C. We have shown only one terminal of the protected line-section 6, with the understanding that the other terminal is, or may be, a duplicate of the terminal which is illustrated in Fig. 1 or Fig. 2.

In Fig. 1, we use a phase-fault distance-relay assembly 8, which is diagrammatically indicated as a box containing the three phase-fault impedance-relay make-contacts ZA, ZB and ZC, for responding respectively to phase-AB faults, phase-BC faults, and phase-CA faults. These relays are suitably energized from a set of line-current transformers 9 and potential-transformers 10, in a known manner. The distance-settings for these impedance-elements are such that each relay has a balance-point which is just safely beyond the far end of the protected line-section.

In Fig. 1, we also use a phase-selector assembly 12, which is symbolized by a box having three sets of make-contacts and three sets of back-contacts, marked SA, SB and SC, for selecting the faulted phase in the event of a ground-fault. This phase-selector operation is preferably obtained by comparing the negative and zero phase-sequence components of the line-currents which are supplied to the phase-selector box 12 by means of a set of line-current transformers 13, as described and claimed in the Goldsborough Patent 2,320,861.

In Fig. 1, we also use a phase-comparison carrier-current relay-apparatus, which is symbolically indicated by a box 14, having a single make-contact marked HKB. This apparatus may be like that which is shown in either the Lensner Patent 2,406,615, or the Mehring et al. Patent 2,408,868, or the Lensner et al. pending application Serial No. 758,200. It is used as a pilot-channel means for comparing the phases of the line-currents at the two ends of the protected line-section 6. It is energized by a set of line-current transformers 15, and it is connected, at 16, to a carrier-current coupling-capacitor 17 which is shown as being connected to the phase-C line-conductor, on the line-side of a carrier-current trap 18.

While we have indicated three different sets of line-current transformers, 9, 13 and 15, for convenience in schematically indicating the principles of our invention in Fig. 1, it will be understood, of course, that usually only a single set of line-current transformers would be utilized to supply the relaying-currents for all three equipments, 8, 12 and 14.

In Fig. 1, we have also indicated a schematic, or across-the-line, diagram of the direct-current tripping-circuits and their associated control-circuits. The various relays and switches are invariably shown in their open or deenergized positions. In each case, the main or operating coil of a relay is given a letter-designation or legend, and the same letter-designation or legend is applied to all of the contacts of that relay. Different phases are distinguished by appropriate letters. Arrows are used to symbolically indicate how the various parts of each relay are connected together.

In the direct-current circuits of Fig. 1, the phase-comparing carrier-current relaying-contact HKB is used to energize an auxiliary relaying-bus 20 from the positive bus (+). This relaying-bus 20 is energized therefore, after the carrier-current equipment has determined that there is a fault, which requires tripping, in the protected line-section 6, but the carrier-current response, of the contact HKB, does not discriminate as to whether the fault is a phase-fault or a ground-fault, or which phase or phases are affected.

In accordance with our invention as shown in Fig. 1, various relaying-circuits 21 to 27 are connected to the bus 20, to provide the proper phase-selection and control.

The relaying-circuit 21 is a phase-A ground-fault relaying-circuit. Starting with the bus 20, it includes, in order, the SA make-contact, the SC back-contact, and one of the three back-contacts X3 of a slugged or delayed-action relay X3, then the conductor 21, the operating-coil CSX of an auxiliary relay CSX, the trip-circuit TA, the trip-coil TC—A of the phase-A breaker CB—A, and the auxiliary make-contact aA of the same breaker, the circuit being completed at the negative bus (—). The CSX coil is shunted by the back-contact CSB of an auxiliary relay CSB.

The next two relaying-circuits 22 and 23 are circuits similar to the circuit 21, which changes in the lettering for the different phases.

The next three relaying-circuits 24, 25 and 26 are phase-fault circuits, for directly tripping the respective trip-circuits TA, TB and TC, through connections 24A, 25B and 26C, respectively, in response to the corresponding phase-fault impedance-relay contact ZA, ZB or ZC, respectively. These circuits 24, 25 and 26 are also used, respectively, to energize the respective auxiliary-relay coils CSA, CSB and CSC, through the auxiliary breaker-switches aA', aB' and aC', respectively, the circuits being completed at the negative bus (—).

The last relaying-circuit 27, in Fig. 1, is utilized to directly energize the operating-coil X3 of the auxiliary relay X3, which is symbolically shown as being provided with a slug or short-circuiting washer 28 for introducing a small time-delay in the picking up and dropping out of this relay. The purpose of the slugged or time-delayed action of the relay X3, with its three back-contacts in the ground-fault relaying-circuits 21, 22 and 23, is to prevent incorrect tripping when the fault-clearing breaker opens, and one of the phase-sequence selector-relays SA, SB and SC has a momentary incorrect response due to the line-current transient.

In accordance with our invention as shown in Fig. 1, each of the auxiliary relays CSX, CSY and CSZ is provided with two correspondingly lettered make-contacts, which are used to join together all three of the first three relaying-circuits 21, 22 and 23, whenever any one of these auxiliary relays is energized. Each of the operating-coils CSX, CSY and CSZ has so much impedance that the corresponding trip-circuit TA, TB or TC does not receive an effective or adequate tripping-current, through the coils CSX, CSY or CSZ, when that coil is placed in circuit by the opening of the shunt-connected back-contacts CSB, CSC or CSA, respectively.

The tripping-sequence of the apparatus shown in Fig. 1 is as follows:

In the event of a single phase-to-ground fault, say on the line-conductor A, the phase-A trip-circuit TA is energized through the HKB contact and the make-contact of the SA phase-selector, which picks up in response to the phase-A fault. All of the other contacts of the phase-A tripping-circuit 21—TA are already closed, at the time when the make-contacts HKB and SA close. If one of the impedance-contacts, for instance the phase-fault contact ZA, should close, in response to a phase-A ground-fault very close to the relaying-switch, it would merely establish another tripping-path to the same trip-circuit TA, so that only the phase-A breaker CB—A would be tripped. The phase-fault impedance-contact ZA would also energize the corresponding auxiliary relay CSA, causing its back-contact to remove the short-circuit around the CSZ coil, in the circuit 23, but nothing else would happen because this circuit 23 is open at the make-contact of the SC phase-selector, which does not respond to a phase-A line-to-ground fault.

In the event of a phase-to-phase fault, for example a fault between the phases B and C, the phase-fault relay-contact ZB would close, thus tripping the phase-B breaker CB—B. No response would be obtained by the phase-selector elements SA, SB and SC, because there is no zero-sequence current for a phase-to-phase fault.

In the event of a two-phase-to-ground fault, such as a fault from B to C to ground, the ZB contact closes, as it should do, but the phase-A selector SA also erroneously responds, as explained in the Goldsborough Patent 2,320,861. The ZB contact trips the phase-B circuit-breaker, and it also energizes the auxiliary relay CSB, which opens its back-contact CSB, thus allowing the CSX coil to be energized in the phase-A tripping-circuit through the HKB make-contact, the SA make-contact, and the SC and X3 back-contacts in the circuit 21. This does not immediately trip the phase-A tripping-circuit TA, because of the high impedance of the CSX coil, but the CSX relay picks up, and its two make-contacts CSX short-circuit all three of the relaying-circuits 21, 22 and 23, thus energizing all three trip-circuits except the phase-A tripping-circuit 21—TA, which is kept open by the open back-contact CSB. The phase-C tripping-circuit TC is energized, for example, through the HKB make-contact, the contacts SA, SC and X3 in the circuit 21, and the CSX contact to the circuit 23, continuing through the CSA back-contact to the trip-circuit TC. Thus the two proper circuit-breakers CB—B and CB—C are tripped, in the event of a double ground-fault affecting phases B and C.

In the event of a three-phase fault, all three breakers are tripped, through the three phase-fault impedance-relay contacts ZA, ZB and ZC.

In Fig. 2, we show our invention applied in a single-pole tripping-system, and this system also includes a novel feature involving the use of triply adjustable modified-impedance relays of the type shown in the Goldsborough Patent 2,393,983. Thus, in Fig. 2, instead of using the impedance-relay box or panel 8 of Fig. 1, we utilize a box or panel 31 of modified-impedance relays, having contacts which are designated as ZM—A, ZM—B and ZM—C, respectively. The significant thing about a modified-impedance relay is that its characteristic response-circle, instead of having its center at the origin, as in a true impedance-relay, has its circle-center displaced from the origin in any direction and by any amount, according to the adjustments which are provided on the relay, reference being made to the response-circle which is obtained when the pick-up value of the impedance to which the relay responds, at its balance-point, is plotted against the line-resistance R and the line-inductance X, for all possible phases of the line-current, throughout the entire 360° phase-shift. In other respects, the alternating-current connections and the alternating-current apparatus of Fig. 2 are similar to those in Fig. 1, and need no further description.

The direct-current connections in Fig. 2 are somewhat different from those in Fig. 1. They involve the same HKB contact for energizing the relaying-bus 20. Its three ground-fault phase-selector circuits 21', 22' and 23' are much simpler than in Fig. 1, in that each of the circuits 21', 22' and 23' of Fig. 2 includes only one selector-relay contact, namely the make-contact for its particular selector, SA, SB or SC, as the case may be, in series with one of the three X3 back-contacts, and nothing else.

Fig. 2 does not utilize the phase-fault tripping-circuits 24, 25 and 26 of Fig. 1, but instead, uses circuits 24', 25' and 26' each of which contains only a single contact, that contact being one of the three make-contacts MG of a gang-tripping auxiliary relay MG. These relay-circuits 24', 25' and 26' directly energize the respective trip-circuits TA, TB and TC from the relaying-bus 20. The auxiliary switches CSA, CSB and CSC of Fig. 1 are not used in Fig. 2.

In Fig. 2, a triply energized relaying-circuit 32 is utilized, which is energized from the relaying-bus 20 through the three parallel-connected contacts ZM—A, ZM—B and ZM—C of the modified impedance-relays. The circuit 32 energizes the operating-coil MG of the gang-tripping relay MG, so as to trip all three circuit-breakers whenever there is a phase-fault response of any one of the elements ZM—A, ZM—B or ZM—C.

In the operation of the Fig. 2 system, it will be noted that a single-phase ground-fault will pick up the proper one of the three phase-selectors SA, SB or SC, as the case may be, thus resulting in a single-pole breaker-operation, or the tripping of a single one of the three single-pole circuit-breakers CB—A, CB—B and CB—C. Any other kind of fault will involve more than one phase of the line-conductors, and will result in a gang tripping-operation, or a tripping of all three of the breakers, as a result of the response of any one of the phase-fault elements ZM—A, ZM—B or ZM—C, energizing the master-tripping relay MG.

In the single-pole protective relaying-system of the Goldsborough Patent 2,320,861, difficulty was experienced, as explained in the patent, because of the occasional response of a phase-fault element to a close-by phase-to-ground fault, requiring a considerable amount of supervision, in order to guard against such a contingency.

In accordance with our invention, as shown in Fig. 2, we guard against the unwanted response of a phase-fault relay to a severe single-phase ground by changing the phase-fault relay from a pure impedance-relay to a particular adjustment of a modified impedance-relay, in which the impedance-circle is displaced so that the relay will not respond to single-phase ground-faults, but will readily respond to the phase-to-phase fault to which it is expected to respond.

A typical phase-fault distance-relay adjustment in accordance with our invention is shown in Fig. 3, wherein the circle represents the response-characteristic of one of our modified-impedance relays, such as the ZM—A relay. It will be noted that the circle-center lies in the R-axis, and is displaced to the right from the origin O.

This phase-A modified-impedance relay is commonly impressed with the phase-AB current $(I_a-I_b)$, and with the phase-AB voltage $(E_a-E_b)$. The derived line-voltage $E=(E_a-E_b)$ lies in the R-axis in Fig. 3. The derived fault-current, for a phase-AB phase-fault, lags the voltage E by 60°, and thus the relay sees a 60° lagging impedance $Z_{FP}$, as indicated in Fig. 3. For a phase-A ground-fault, however, the fault-current lags the voltage E by 120°, and produces the effect of a 120° lagging impedance $Z_{FG}$, as shown in Fig. 3.

Heretofore, in systems using pure impedance-relays, with the circle-center at the origin, a severe phase-A fault, with its impedance lying in the line $Z_{FG}$ in Fig. 3, has had a small enough apparent impedance to fall within the response-circle characteristic of the phase-AB phase-fault impedance-relay. In accordance with our invention, a modified-impedance relay ZM—A is used, in which the circle-center is displaced in such a direction that the ohm-response of the relay is very small in the direction of the ohm-vector $Z_{FG}$ for phase-A ground-faults, while the relay has the required ohm-response reach to respond to phase-AB faults having an ohm-vector lying in the line $Z_{FP}$.

The relative angles of the currents and voltages, as seen by a phase-AB relay, are shown in Figs. 4 and 5, for a 60°-line. In these figures, the uncollapsed (or fault-free) delta line-voltages are represented by the triangles $abc$.

Fig. 4 shows the conditions for a zero-impedance phase-A ground-fault. The line-voltages are collapsed to $nbc$. The impressed relay-voltage $(E_a-E_b)$ is opposite, in phase, to the voltage $nb$, as shown at $E_{FG}$ in Fig. 4. The phase-A ground-fault current, lagging 60° behind the collapsed line-voltage $na$, is shown at $I_{FG}$ in Fig. 4, and this is seen to be 120° behind the impressed relay-voltage $E_{FG}$.

Fig. 5 shows the voltage and current conditions in a phase-A phase-relay, for a resistanceless fault across the phases A and B. The voltage-vector triangle is collapsed to $cn'$. The relay-voltage $E=(E_a-E_b)$ is a very small voltage which is in phase with the collapsed phase-A voltage $n'a$, so that the relay-voltage lies somewhere in the line $n'a$ in Fig. 5. The phase-AB fault-current $I_{FP}$, for a phase-AB fault on a 60°-line, lags 60° behind the collapsed phase-A line-voltage $n'a$, so that the apparent fault-current which is impressed on the relay for a phase-AB phase-fault is $I_{FP}=(I_a-I_b)$, which lags 60° behind the relay voltage-vector $n'a$, shown in Fig. 5.

While we have shown our invention in only two illustrative forms of embodiment, and while we have explained useful adjustments and connections for our relay-system, we wish it to be understood that many modifications may be made, by way of additions, omissions and substitutions, without departing from the essential spirit of our invention. We desire, therefore, that the appended claims shall be accorded the broadest construction consistent with their language.

We claim as our invention:

1. Fault-responsive protective relaying-means for controlling each of a plurality of single-pole circuit-interrupters in the several phase-conductors of a three-phase line, comprising a pilot-channel relaying-means for obtaining a relay-operation in response to a comparison of the phase-angle between line-currents at the opposite ends of the protected line-section, ground-fault phase-selector means for obtaining a phase-selecting relay-operation in response to line-conditions obtaining in the event of a line-to-ground fault, phase-fault phase-selector means for obtaining a phase-selecting relay-operation in response to line-conditions obtaining in the event of a phase-to-phase line-fault, and circuit-interrupter control-circuit means for controlling the several single-pole circuit-interrupters in joint response to said pilot-channel relaying-means and said ground-fault phase-selector means, and also in joint response to said pilot-channel relaying-means and said phase-fault phase-selector means.

2. The invention as defined in claim 1, characterized by said phase-fault phase-selector means including a modified-impedance phase-fault relay-means having its impedance-characteristics displaced from the origin of resistance-and-inductance coordinates in such direction that said relay-means has a very small ohm-responsive reach at the apparent impedance-angle which is obtained for nearby line-to-ground faults, while having an adequate ohm-responsive reach at the apparent impedance-angle which is obtained for phase-to-phase faults just beyond the far end of the protected line-section.

3. The invention as defined in claim 1, characterized by said phase-fault phase-selector means including three modified-impedance phase-fault relaying-means for the several combinations of line-to-line phase-fault phases, and a master-controller relaying means for controlling all three single-pole circuit-interrupters in joint response to the pilot-channel relaying-means and any one of said modified-impedance phase-fault relaying- means, each of said modified-impedance phase-fault relay-means having its impedance-characteristics displaced from the origin of resistance-and-inductance coordinates in such direction that said relay-means has a very small ohm-responsive reach at the apparent impedance-angle which is obtained for nearby line-to-ground faults, while having an adequate ohm-responsive reach at the apparent impedance-angle which is obtained for phase-to-phase faults just beyond the far end of the protected line-section.

4. Fault-responsive protective relaying-means for controlling each of a plurality of single-pole circuit-interrupters in the several phase-conductors of a three-phase line, comprising a pilot-channel relaying-means for obtaining a fault-responsive relay-operation under the supervision of pilot-channel intelligence received from the far end of the protected line-section, ground-fault phase-selector means for obtaining a phase-selecting relay-operation in response to line conditions obtaining in the event of a line-to-ground fault, phase-fault phase-selector means for obtaining a phase-selecting relay-operation in response to line-conditions obtaining in the event of a phase-to-phase line-fault, said phase-fault phase-selector means including a single modified-impedance phase-fault relay-element having its impedance-characteristic displaced from the origin of resistance-and-inductance coordinates in such direction that said relay-element has a very small ohm-responsive reach at the apparent impedance-angle which is obtained for nearby line-to-ground faults, while having an adequate ohm-responsive reach at the apparent impedance-angle which is obtained for phase-to-phase faults just beyond the far end of the protected line-section, and circuit-interrupter control-circuit means for controlling the several single-pole circuit-interrupters in joint response to said pilot-channel relaying-means and said ground-fault phase-selector means, and also in joint response to said pilot-channel relaying-means and said phase-fault phase-selector means.

5. Fault-responsive protective relaying-means for controlling each of a plurality of single-pole circuit-interrupters in the several phase-conductors of a three-phase line, comprising a pilot-channel relaying-means for obtaining a fault-responsive relay-operation under the supervision of pilot-channel intelligence received from the far end of the protected line-section, ground-fault phase-selector means for obtaining a phase-selecting relay-operation in response to line-conditions obtaining in the event of a line-to-ground fault, phase-fault phase-selector means for obtaining a phase-selecting relay-operation in response to line-conditions obtaining in the event of a phase-to-phase line-fault, said phase-fault phase-selector means including three modified-impedance phase-fault relaying-elements for the several combinations of line-to-line phase-fault phases, a master-controller relaying means for controlling all three single-pole circuit-interrupters in joint response to the pilot-channel relaying means and any one of said modified-impedance phase-fault relaying elements, and circuit-interrupter control-circuit means for controlling the several single-pole circuit-interrupters in joint response to said pilot-channel relaying-means and said ground-fault phase-selector means, each of said modified-impedance phase-fault relay elements having its impedance-characteristic displaced from the origin of resistance-and-inductance coordinates in such direction that said relay-element has a very small ohm-responsive reach at the apparent impedance-angle which is obtained for nearby line-to-ground faults, while having an adequate ohm-responsive reach at the apparent impedance-angle which is obtained for phase-to-phase faults just beyond the far end of the protected line-section.

SHIRLEY L. GOLDSBOROUGH.
JOHN L. BLACKBURN.

REFERENCES CITED

The following references are of record in the file of this patent:

UNITED STATES PATENTS

| Number | Name | Date |
|---|---|---|
| 2,255,934 | Lenehan et al. | Sept. 16, 1941 |
| 2,320,861 | Goldsborough | June 1, 1943 |
| 2,329,043 | Goldsborough et al. | Sept. 7, 1943 |
| 2,372,078 | Goldsborough | Mar. 20, 1945 |
| 2,381,282 | Harder | Aug. 7, 1945 |
| 2,386,209 | Goldsborough | Oct. 9, 1945 |
| 2,393,983 | Goldsborough | Feb. 5, 1946 |